United States Patent [19]

Caldwell

[11] 4,400,757
[45] Aug. 23, 1983

[54] AUTOMATIC SPEED CONTROL SYSTEMS

[75] Inventor: Kenneth B. Caldwell, Rugby, England

[73] Assignee: Associated Engineering Limited, Rugby, England

[21] Appl. No.: 285,632

[22] Filed: Jul. 21, 1981

[30] Foreign Application Priority Data

Aug. 10, 1980 [GB] United Kingdom ............... 8025883

[51] Int. Cl.³ ............................................ G05D 13/62
[52] U.S. Cl. .................................. 361/236; 361/240; 361/242
[58] Field of Search ..................... 361/236, 240, 242

[56] References Cited

U.S. PATENT DOCUMENTS

| | | |
|---|---|---|
| 3,575,256 | 2/1969 | Jania et al. |
| 3,790,855 | 2/1974 | Hillman, Jr. ................... 361/240 X |
| 4,196,466 | 4/1980 | Noddings et al. ............. 361/240 X |
| 4,336,566 | 6/1982 | Noddings et al. ............. 361/236 X |
| 4,352,403 | 10/1982 | Burney ........................... 361/242 X |

FOREIGN PATENT DOCUMENTS 1386961 2/1971 United Kingdom .
1493623 3/1974 United Kingdom .

Primary Examiner—Harry E. Moose, Jr.
Attorney, Agent, or Firm—Leydig, Voit, Osann, Mayer & Holt, Ltd.

[57] ABSTRACT

An automatic speed control system is disclosed in which an error signal Ve, representing the speed error of the vehicle, is added to a ramp voltage, ramping between fixed values, to produce a control signal Vc. Two comparators compare Vc with upper and lower limits, respectively, so as to produce a pulse train on one of two lines depending on the sign of the error and having a mark-space ratio depending on the magnitude of the error. A circuit responds to the first pulse to occur in the pulse train from one of the two comparators when the vehicle is accelerating towards and overshooting a new desired speed and, via a switching circuit, lowers the upper limit applied to that comparator so as to lengthen the first pulses and help to reduce overshoot of the desired speed. When the vehicle ceases accelerating, the upper limit is switched back to the desired value, and is also switched back to its original setting when the speed falls by a preset amount.

9 Claims, 3 Drawing Figures

AUTOMATIC SPEED CONTROL SYSTEMS

BACKGROUND OF THE INVENTION

The invention relates to speed-responsive electrical systems and circuit arrangements and more specifically to such systems and circuit arrangements responsive to the speed of a vehicle, such as a road vehicle, and, for example, for automatically controlling the speed of the vehicle.

Such systems are known comprising comparing means for comparing signals respectively representing the actual and desired speeds of the vehicle so as to produce an error signal dependent on the speed error (if any) between them, output means responsive to the error signal and capable of producing control outputs according as to whether the actual vehicle speed is greater or less than the desired speed, and speed correcting means operative to produce a speed correction in dependence on the magnitude of the control output received so as to tend to reduce the speed error to zero.

An object of the invention is to provide an improved automatic speed control system for a vehicle.

Another object of the invention is to provide such a system which gives smoother control.

BRIEF SUMMARY OF THE INVENTION

According to the invention, there is provided an automatic speed control system for controlling the speed of a vehicle, comprising means for comparing signals respectively representing the actual and desired speeds of the vehicle so as to produce an error signal having a sign and magnitude dependent on the sign and magnitude of the speed error (if any) between them, output means responsive to the error signal and capable of producing a first or a second control output according as to whether the actual vehicle speed is greater or less than the desired speed, speed correcting means operative to produce a speed correction in dependence on the magnitude of the control output received so as to tend to reduce the speed error to zero, and modifying means operative after the speed error has changed sign to modify at least one said control output whereby to provide a temporary change in the mean level of that control output.

DESCRIPTION OF THE DRAWINGS

An electrical system for automatically controlling a road vehicle to run at a set speed which may be selected by the driver, and embodying the invention, will now be described, by way of example, with reference to the accompanying diagrammatic drawings in which.

DESCRIPTION OF PREFERRED EMBODIMENTS

Figure 1:
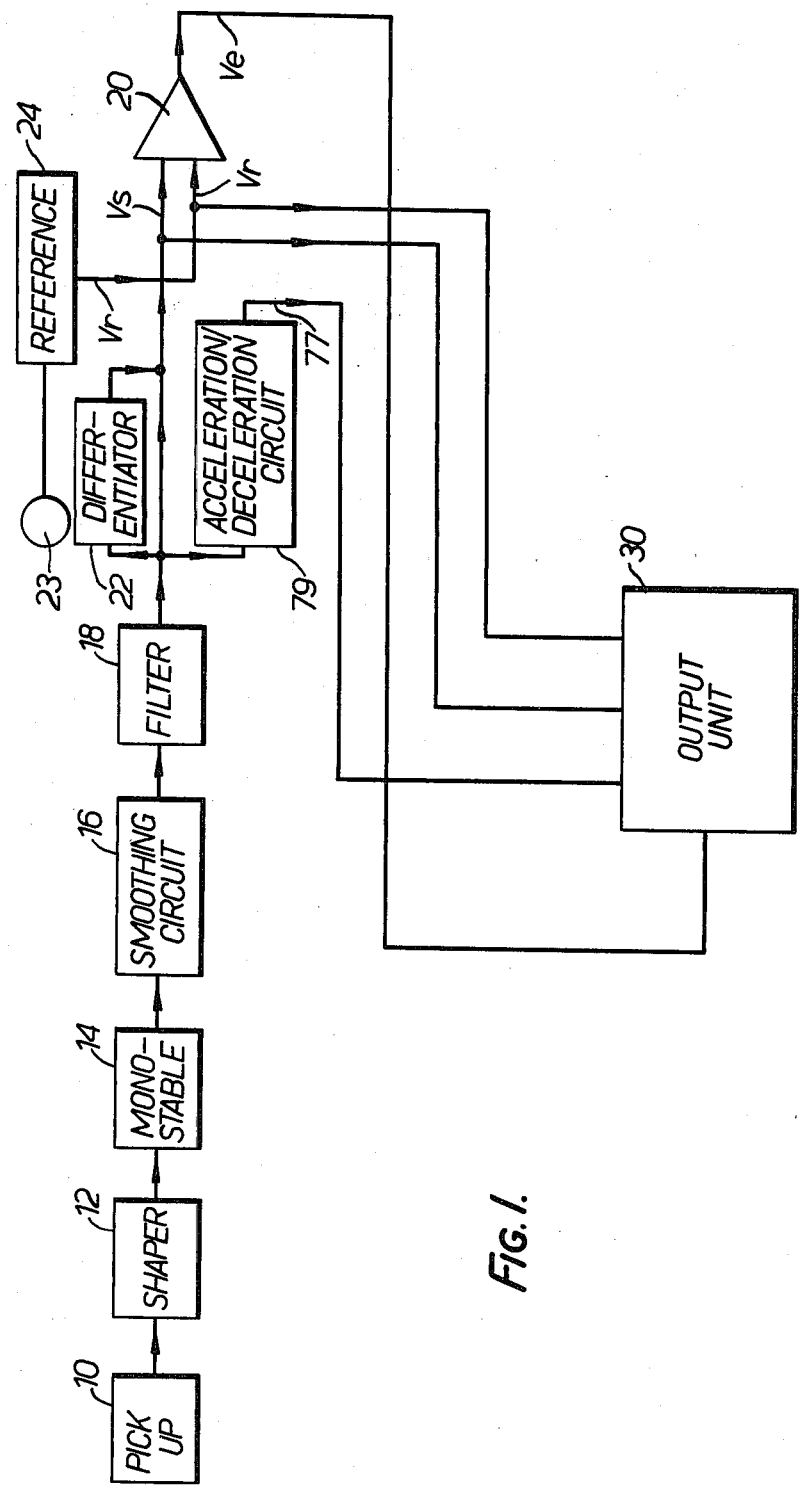
FIG. 1 is a block circuit diagram of the system.

As shown in FIG. 1, a signal representing the speed of the vehicle is derived by means of a pick-up 10 which may be in the form of a transducer, such as a magnetic transducer, sensing rotation of the propeller shaft of the vehicle. The pick-up 10 produces pulses at a frequency dependent on the road speed of the vehicle and these are shaped into a square wave in a shaping circuit 12 and used to control a monostable 14 which therefore produces constant width pulses at a frequency dependent on the road speed. A smoothing circuit 16 smooths the pulses into a unidirectional voltage having a value which is dependent on road speed (in this example it is arranged to be inversely dependent on road speed). A filter 18 removes most of the ripple on this voltage to produce an output signal which is fed to the first input of a comparator 20 and also to a differentiating circuit 22 which feeds the same input of the comparator. The effect of the differentiating circuit 22 is to augment the signal applied to the comparator 20 from the filter 18 when a sudden change occurs in the filter output. The purpose of this is to tend to stabilise the control system.

The signal applied to the first input of the comparator 20 is referred to below as Vs and is inversely dependent on the road speed of the vehicle.

In order to be able to select the desired road speed for the vehicle, the driver has a control 23 by means of which he can adjust a setting circuit 24 (a potential divider network, for example) to produce a desired speed signal Vr on a line 26. Signal Vr is fed to the second input of the comparator 20. The output of the comparator 20 is therefore an error signal Ve whose sign and magnitude are dependent on the sign and magnitude of the difference between the desired speed Vr and the actual speed Vs. The signal Ve is fed to an output control unit 30 to adjust the power output of the vehicle's engine in a direction and by an amount so as to bring the vehicle speed to the desired value Vr, at which the value of the error tends to zero.

FIG. 1 also shows an acceleration/deceleration detecting circuit 79, responsive to the signal Vs, which is connected to the output control unit 30 for a purpose to be explained by a line 77.

Figure 3:
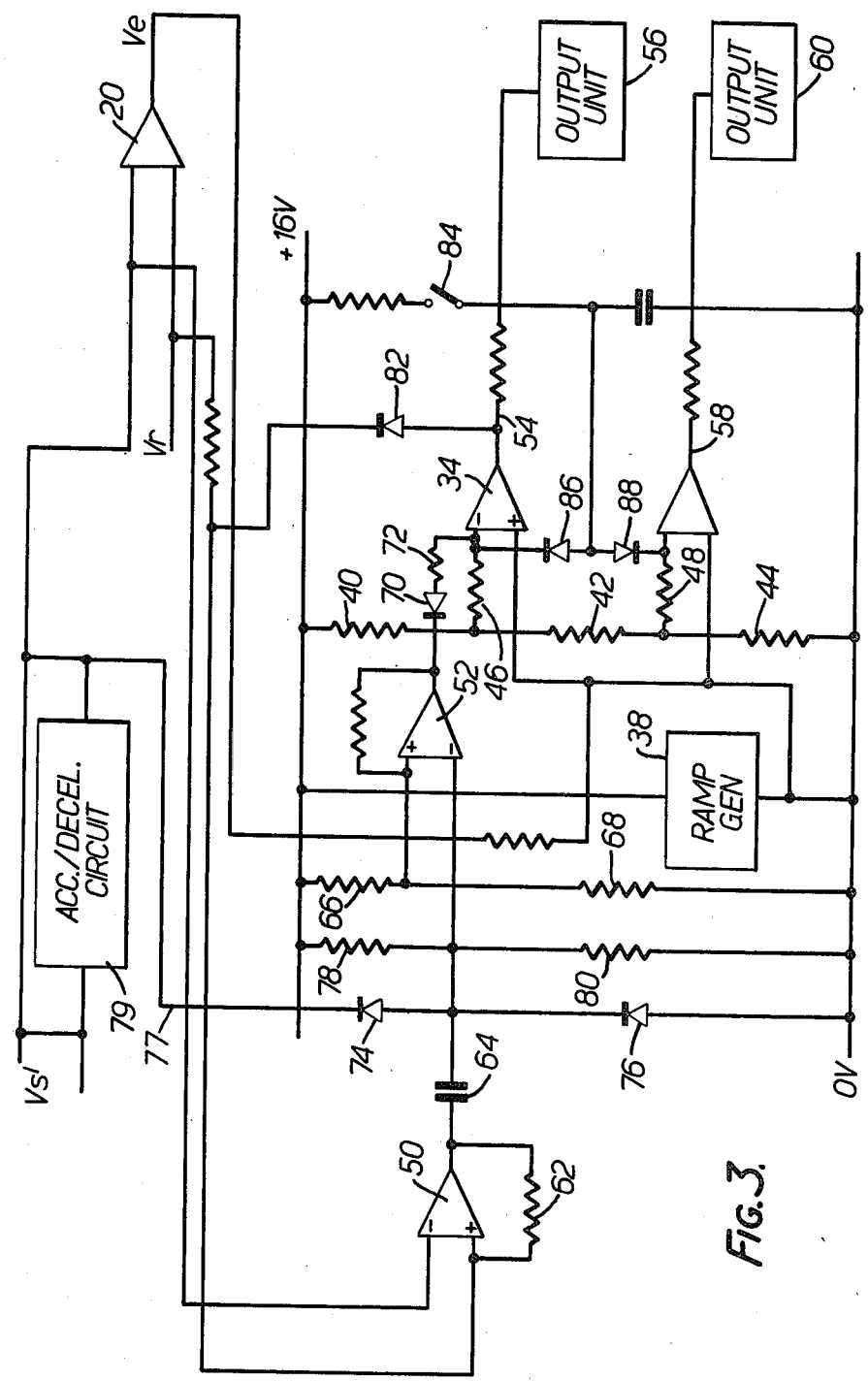
FIG. 3 is a schematic circuit diagram of part of the system.

FIG. 3 shows the electrical circuit of the output control unit 30. FIG. 3 also shows the output comparator 20 and the acceleration/deceleration circuit 79 of FIG. 1 but the remainder of the circuitry of FIG. 1 is omitted for the sake of clarity.

The signal Ve is fed to the positive input of each of two comparators 34 and 36, together with the output of a ramp generator 38 which generates an electrical waveform of triangular shape ramping between fixed limits and which is therefore added to the error signal Ve to produce a resultant signal Vc at the first input of each comparator.

The negative input of each comparator receives a respective reference level. As shown, each negative input of the comparator is connected to a point on a potential divider comprising resistors 40,42 and 44 so that comparator 34 compares Vc with a relatively high reference level Vh received via a resistor 46, while comparator 36 compares Vc with a relatively low reference level Vl received via a resistor 48.

In addition, however, the value of the reference signal Vh can be varied by means of a comparator 50 and a switching circuit 52 in a manner to be explained.

Figure 2:
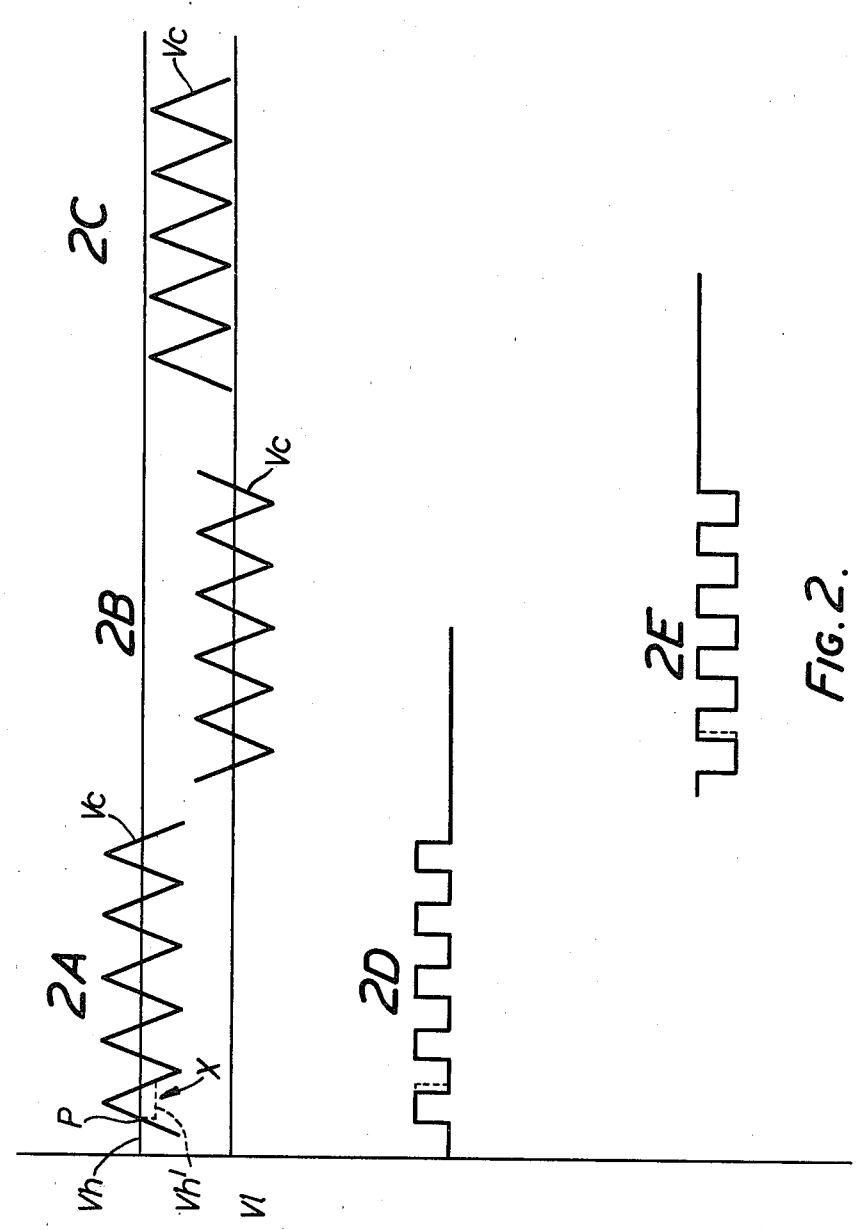
FIG. 2 shows waveforms occurring in the system.

FIG. 2 illustrates the operation of the comparators 34 and 36 and shows the references Vh and Vl applied to the comparators 34 and 36. Initially, the effects of the comparator 50 and switching circuit 52 will be ignored and it will therefore be assumed that both Vh and Vl are fixed.

At 2A is shown the signal Vc in circumstances in which the vehicle speed is above the desired value, this therefore being a situation in which Ve is significantly above its datum value. The effect of this is that the peaks of Vc rise above Vh causing the comparator 34 to produce a succession of output pulses, 2D in FIG. 2, on a line 54 at the ramp frequency which drive an output circuit 56 whose operation tends to reduce the output power of the vehicle engine. During this time, comparator 36 produces a continuous output which holds an output circuit 60 in a setting in which it does not tend to increase engine power.

At 2B in FIG. 2, the signal Vc is shown when the vehicle speed is below the desired value, this being a situation in which Ve is significantly below the datum value. Therefore, the troughs of Vc fall below the reference Vl and comparator 36 produces output pulses (2E in FIG. 2) on the line 58 which drive the output circuit 60 and cause it to increase the power of the engine. Comparator 34 produces no output at this time and output unit 56 is therefore held in a setting in which it does not tend to decrease the engine power.

At 2C in FIG. 2, the vehicle speed is assumed to be at the correct value and the signal Vc lies wholly between the upper and lower references Vh and Vl. Therefore, comparator 34 produces no output and comparator 36 produces the continuous output mentioned above, and the engine power is maintained constant.

When there is a speed error, the mark-space ratio at which the appropriate output circuit 56 or 60 (depending on whether the vehicle speed is above or below the desired speed) is operated will depend on the magnitude of the speed error.

The output circuits 56 and 60 can control the engine power in any suitable way such as by controlling the engine throttle or the injection pump rack in the case of a diesel engine, by a suitable electrical mechanical or pneumatic or other linkage. Purely by way of example, reference is made to United Kingdom Pat. No. 1,386,961 for a disclosure of some possible ways of controlling engine power.

The operation and effect of the comparator 50 and switching circuit 52 will now be considered.

Comparator 50 receives the signal Vs and also, via a resistor 61, the signal Vr. It has a feedback resistor 62 and is connected via a capacitor 64 to one input of the switching circuit 52 whose other input is held at a fixed potential by resistors 66 and 68. Switching circuit 52 is connected to the negative input of the comparator 34 via a diode 70 and a resistor 72.

Capacitor 64 is also connected to the junction between two diodes 74 and 76 connected between the zero volt supply line and the output line 77 from the acceleration/deceleration detecting circuit 79 (responsive to the signal Vs), and this junction is connected to the junction between two resistors 78 and 80.

The output line 54 of comparator 34 is connected to the line feeding Vr to comparator 50 via a diode 82.

In explaining the operation of the comparator 50 and the switching circuit 52, it will initially be assumed that the switching circuit 52 is off, so that diode 70 is biassed non-conducting.

The purpose of the comparator 50 is to increase the length of the first pulses produced by the comparator 34 on line 54 as the vehicle speed increases and overshoots the desired speed. For example, comparator 50 will come into operation after the driver has reset the desired speed signal Vr to call for a higher vehicle speed or if he has overridden the system to cause the vehicle speed to fall significantly and has then allowed the system to take over again and bring the speed up to the desired value. Initially, the value of the signal Vc will be such that comparator 34 will produce no output and comparator 36 will operate so as to hold the power of the engine at the maximum. As the vehicle speed rises towards the desired value, the signal Vc will rise and pass through the situation shown at 2B in FIG. 2 causing the previously continuous output produced by comparator 36 to become pulsed with decreasing mark-space ratio, thus preventing increase of engine power. However, because the throttle is still fully open, the vehicle speed will continue to increase and eventually a peak of the signal Vc will intersect the reference Vh as shown at P in FIG. 2.

Up to this time, Vs will be greater than Vr' at the input of the comparator 50 and the latter will produce no output. However, when the first peak of Vc intersects the reference Vh, a pulse will be produced by comparator 34 which will be fed by diode 82 to increase Vr' above Vs and comparator 50 will therefore switch and produce an output to switch the switching circuit 52. Diode 70 will therefore conduct and the result of this is to lower the reference Vh to Vh' as shown dotted at X in FIG. 2. The effect of this is to lengthen the first pulse produced by comparator 34. This pulse is of course also fed to output unit 56 and therefore provides a greater then normal decrease in engine power for the purposes of preventing further increase in the vehicle speed and reducing overshoot of the set speed.

The reference level on comparator 34 will remain at the lower level Vh' for so long as the vehicle continues to accelerate. As soon as the vehicle ceases accelerating, however, line 77 will go negative and render the diode 74 conductive. Therefore, the input to the switching circuit 52 will go negative and the switching circuit will switch off, thus returning the reference level at the input of comparator 34 to Vh.

Comparator 50 will switch back to its original state when Vs rises above Vr' by more than a small preset value.

When the reference level is reduced to Vh' as described above, the reference level Vl on comparator 36 will also be reduced via resistors 46 and 48 but not by so much as Vh.

If desired, the comparator 36 may be provided with a comparator and a switching circuit corresponding to comparator 50 and switching circuit 52 and operating in a corresponding manner so as to raise Vl slightly in the event of the vehicle speed falling below the required level. The effect of this would therefore be to lengthen the output pulses produced by comparator 36 while the reference was at the new level, and thus increase the engine power for the purposes of preventing further fall in speed and reducing undershoot of the set speed. The reference would be switched back to the level Vl when the vehicle ceased decelerating.

Shown in FIG. 3 is a switch 84 which is arranged to be closed when the driver disengages the clutch. Closure of this switch applies a high level to the reference inputs of the comparators 34 and 36 via diodes 86 and 88. This enables the driver to have full control over the engine speed via the accelerator pedal for the purpose of accelerating the engine during gear changing.

What is claimed is:

1. An automatic speed control system for controlling the speed of a vehicle, comprising comparing means for comparing signals respectively representing the actual and desired speeds of the vehicle so as to produce an error signal having a sign and magnitude dependent on the sign and magnitude of the speed error (if any) between them, output means responsive to the error signal and capable of producing a first or a second control output according as to whether the actual vehicle speed is greater or less than the desired speed, speed correcting means operative to produce a speed correction in dependence on the magnitude of the control output received so as to tend to reduce the speed error to zero, and modifying means operative after the speed error has changed sign to modify at least one said control output whereby to provide a temporary change in the mean level of that control output.

2. A system according to claim 1, including cancelling means operative to cancel the operation of the modifying means when the vehicle next ceases to change in speed, each said control output comprises a respective pulse train whose mean level determines the magnitude of the control output.

3. A system according to claim 2, in which each pulse train comprises pulses of fixed amplitude and variable mark-space ratio, and in which the modifying means operates by increasing the length of at least the first pulse of the pulse train corresponding to the said one control output.

4. A system according to claim 1, in which each said control output has a steady, relatively high, level when the respective speed error is greater than a predetermined value and a steady relatively low or zero level when the speed error is substantially zero.

5. A system according to claim 1, in which the said one control output is the said first control output.

6. A system according to claim 1, in which the output means comprises means for generating a ramp signal ramping in a predetermined manner between fixed values, means for adding the ramp signal to the error signal, and means for comparing the resultant signal with predetermined upper and lower limits whereby to produce a pulse of one said pulse train when and for so long as a peak of the said resultant signal exceeds the upper limit and to produce a pulse of the other pulse train when and for so long as a trough of the said resultant signal falls below the lower limit.

7. A system according to claim 6, in which the modifying means comprises means for temporarily lowering the upper limit.

8. An automatic speed control system for controlling a vehicle to run at a desired speed, comprising comparing means operative to compare signals respectively representing the actual and desired speeds of the vehicle and to produce an error signal dependent on the sign and magnitude of the speed error (if any), means for adding to the error signal a ramp signal ramping in a predetermined manner between fixed values, means for comparing the instantaneous amplitude of the resultant signal with upper and lower limits of respective predetermined values whereby to produce a first control output when and for so long as the instantaneous amplitude of the said resultant signal exceeds the upper limit and to produce a second control output when and for so long as the instantaneous amplitude of the said resultant signal falls below the lower limit, output means connected to receive each control output and operative to produce a speed correcting action whose magnitude is dependent on the mean level of that control output and whose sign depends on whether the control output is the first or the second control output, whereby to tend to reduce the speed error to zero, and means operative when the said resultant signal exceeds the upper limit for the first time following a change in sign of the speed error to lower the value of the upper limit by a predetermined amount so as to provide a temporary increase in the magnitude of the speed correcting action.

9. A system according to claim 8, including cancelling means operative when the vehicle ceases to accelerate to cause the upper limit to revert to the predetermined value.

* * * * *

UNITED STATES PATENT AND TRADEMARK OFFICE
CERTIFICATE OF CORRECTION

PATENT NO. :  4,400,757
DATED      :  August 23, 1983
INVENTOR(S) :  Kenneth B. Caldwell It is certified that error appears in the above—identified patent and that said Letters Patent is hereby corrected as shown below:

On the title page, under "[30] Foreign Application Priority Data":

Change the date "August 10, 1980" to read -- August 8, 1980 --.

*Signed and Sealed this*

*Twenty-seventh* Day of *December 1983*

[SEAL]

*Attest:*

GERALD J. MOSSINGHOFF

*Attesting Officer*  *Commissioner of Patents and Trademarks*